United States Patent
Chen et al.

(10) Patent No.: US 12,360,277 B2
(45) Date of Patent: Jul. 15, 2025

(54) UNCERTAINTY ANALYSIS FOR NEURAL NETWORKS

(71) Applicant: SCHLUMBERGER TECHNOLOGY CORPORATION, Sugar Land, TX (US)

(72) Inventors: Xiaoli Chen, Houston, TX (US); Tao Zhao, Katy, TX (US); Hiren Maniar, Houston, TX (US); Aria Abubakar, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 356 days.

(21) Appl. No.: 17/906,070

(22) PCT Filed: Mar. 9, 2021

(86) PCT No.: PCT/US2021/021513
§ 371 (c)(1),
(2) Date: Sep. 10, 2022

(87) PCT Pub. No.: WO2021/183518
PCT Pub. Date: Sep. 16, 2021

(65) Prior Publication Data
US 2023/0122128 A1    Apr. 20, 2023

Related U.S. Application Data

(60) Provisional application No. 62/987,376, filed on Mar. 10, 2020.

(51) Int. Cl.
*G01V 1/50* (2006.01)
*G06N 3/08* (2023.01)

(52) U.S. Cl.
CPC ................ *G01V 1/50* (2013.01); *G06N 3/08* (2013.01)

(58) Field of Classification Search
CPC . G01V 1/50; G01V 20/00; G01V 3/18; G01V 2210/51; G01V 1/32; G06N 3/08;
(Continued)

(56) References Cited

U.S. PATENT DOCUMENTS

2015/0347898 A1    12/2015  Hiu
2019/0064389 A1     2/2019  Denli
(Continued)

FOREIGN PATENT DOCUMENTS

CA    3053259 A1 *  8/2018  ............. G01V 1/282
GB    2397664 A     7/2004
(Continued)

OTHER PUBLICATIONS

Hao et al. "The hidden layer design for staked denoising autoencoder," 2015 12th International Computer Conference on Wavelet Active Media Technology and Information Processing (ICCWAMTIP), Chengdu, 2015, pp. 150-153 (Year: 2015).*
(Continued)

*Primary Examiner* — Eman A Alkafawi
*Assistant Examiner* — Dilara Sultana
(74) *Attorney, Agent, or Firm* — Jeffrey D. Frantz

(57) ABSTRACT

A method includes receiving geophysical data representative of a geophysical structure; providing the geophysical data as one or more input data to a neural network; training the neural network to reconstruct the geophysical structure that was received and provide one or more uncertainty metrics for one or more features of the geophysical structure that is reconstructed; reconstructing, using the neural network that has been trained, the geophysical structure; and determining, using the neural network that has been trained, the one or more uncertainty metrics by implementing a second drop out condition on the one or more nodes of the one or more hidden layers of the neural network. The training is per-
(Continued)

formed at least partially by implementing a first drop out condition on one or more nodes of one or more hidden layers of the neural network to randomly set an output of the one or more nodes to zero.

18 Claims, 14 Drawing Sheets

(58) Field of Classification Search
CPC .......... G06N 3/044; G06N 3/045; G06N 7/01; G06N 3/082; G06N 3/12; E21B 2200/22
See application file for complete search history.

(56) References Cited

U.S. PATENT DOCUMENTS

| | | | | |
|---|---|---|---|---|
| 2019/0340235 | A1* | 11/2019 | Osbourne | G10L 19/083 |
| 2019/0383965 | A1 | 12/2019 | Salman | |
| 2020/0057933 | A1* | 2/2020 | Cosgrove | H04L 63/1408 |
| 2020/0183047 | A1* | 6/2020 | Denli | G01V 20/00 |

FOREIGN PATENT DOCUMENTS

| | | | | |
|---|---|---|---|---|
| KR | 20180120061 | A | * 11/2018 | |
| WO | WO-2018231708 | A2 | * 12/2018 | G06N 3/04 |

OTHER PUBLICATIONS

Soniya et al., "A review on advances in deep learning," 2015 IEEE Workshop on Computational Intelligence: Theories, Applications and Future Directions (WCI), Kanpur, India, 2015, pp. 1-6 (Year: 2015).*

Bueno et al. "Volcano-Seismic Transfer Learning and Uncertainty Quantification with Bayesian Neural Networks," in IEEE Transactions on Geoscience and Remote Sensing, vol. 58, No. 2, pp. 892-902, Feb. 2020, (Year: 2015).*

Extended Search Report issued in European Patent Application No. 21768002.4 dated Mar. 4, 2024, 7 pages.

International Preliminary Report on Patentability of PCT Application No. PCT/US2021/021513 dated Sep. 22, 2022, 6 pages.

T. Zhao and X. Chen, "Enrich the interpretation of seismic image segmentation by estimating epistemic uncertainty", SEG International Exposition and 90th SEG Annual Meeting, Oct. 11-16, 2020, Houston, USA, pp. 1444-1448.

Mousavi, S. Mostafa, and Gregory C. Beroza. "Bayesian-deep-learning estimation of earthquake location from single-station observations." arXiv preprint arXiv:1912.01144 (2019) <URL: https://arxiv.org/pdf/1912.01144.pdf>.

Cortes-Ciriano, Isidro, and Andreas Bender. "Reliable prediction errors for deep neural networks using test-time dropout." Journal of chemical information and modeling, 59(7) 2019: 3330-3339.

Search Report and Written Opinion of International Patent Application No. PCT/US2021/021513 on Jun. 4, 2022; 9 pages.

* cited by examiner

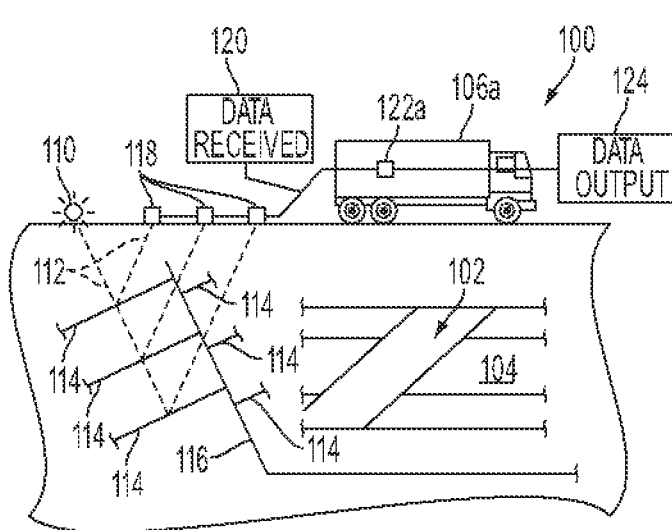
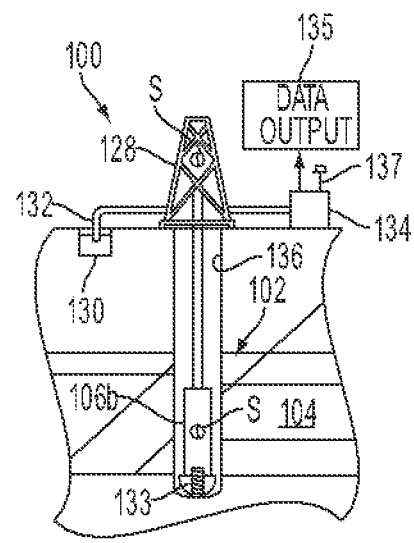
FIG. 1A
FIG. 1B
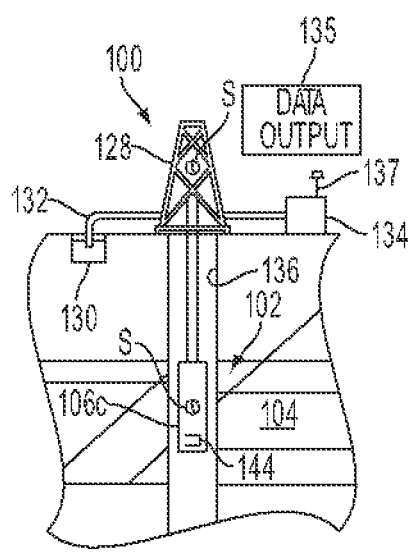
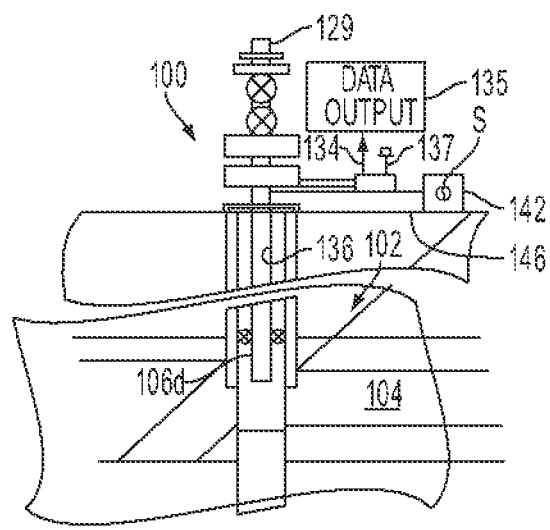
FIG. 1C
FIG. 1D

Denoise Auto Encoder with Dense Layer

Denoise Sequential Auto Endoder with LSTM

Denoise Auto Encoder with 1D-CNN (a)

(b)

UNCERTAINTY ANALYSIS FOR NEURAL NETWORKS

CROSS-REFERENCE TO RELATED APPLICATIONS

This application is a National Stage Entry of International Patent Application No. PCT/US2021/021513, filed on Mar. 9, 2021, which claims priority to U.S. Provisional Patent Appl. No. 62/987,376, filed on Mar. 10, 2020, herein incorporated by reference in its entirety.

BACKGROUND

Machine learning (ML) methods are used in the exploration geophysics field as an alternative to physics-driven solutions. Such ML methods have exhibited empirical success in many applications such as seismic data processing and interpretation. However, due to the "black box" nature of these methods, results from ML methods may be interrogated for their reliability and interpretability.

Some geoscientists prefer having quantitative estimates of probability for which certain geologic features of interest may occur, for example, in the form of seismic attributes, such as fault likelihood for faults. Similarly, when using ML to classify seismic data, a continuous output may be scaled to [0,1] and named "probability" for convenience. However, such "probability" is often just the output from a softmax function, and its value may not provide a link to the statistically-meaningful uncertainty, which, if available, can be complementary to interpret the ML prediction result.

There are two types of uncertainties, aleatoric uncertainty and epistemic uncertainty. While aleatoric uncertainty captures the natural randomness in the observations, the epistemic uncertainty, which accounts for the uncertainty in the model, may be a concern. For physics-based models that describe geoscience processes, various methods and analysis frameworks, such as Markov chain Monte Carlo (MCMC), generalized likelihood uncertainty estimation (GLUE) methodology, and Probability Collocation Method (PCM), have been adopted to quantify the epistemic uncertainty in different applications. However, these frameworks are not applicable to neural network models such as convolutional neural network (CNN).

Recently, a Bayesian approach Monte Carlo (MC) dropout has been proposed to quantify the epistemic uncertainty in neural networks model. Due to its simple implementation, the MC dropout method may be adopted in computer optical imaging, such as biomedical image processing.

SUMMARY

A method, a computing system that performs the method, and a computer-readable medium that stores instructions for performing the method are disclosed. The method includes receiving geophysical data representative of a geophysical structure; providing the geophysical data as one or more input data to a neural network; training the neural network to reconstruct the geophysical structure that was received and provide one or more uncertainty metrics for one or more features of the geophysical structure that is reconstructed, wherein the training is performed at least partially by implementing a first drop out condition on one or more nodes of one or more hidden layers of the neural network to randomly set an output of the one or more nodes to zero; reconstructing, using the neural network that has been trained, the geophysical structure; and determining, using the neural network that has been trained, the one or more uncertainty metrics by implementing a second drop out condition on the one or more nodes of the one or more hidden layers of the neural network.

Various additional features can be included in the method including one or more of the following. The geophysical data can include at least one of poststack seismic amplitude data, prestack seismic amplitude data, seismic amplitude data, seismic amplitude derived properties, well log data, well log derived properties, structure interpretation data, stratigraphy interpretation data, or lithology interpretation data. The well log data can include at least one of gamma ray (GR) logs, neutron porosity (NPHI) logs, or bulk density (RHOZ) logs. The neural network can include a deep learning neural network. The deep learning neural network can include a convolutional neural network (CNN), a point-wise autoencoder with about 3 to about 20 dense layers, a long short-term memory (LSTM) network, a bidirectional LSTM sequential autoencoder, or a 2D/1D-CNN autoencoder with about 5 to about 20 convolutional blocks. The one or more hidden layers comprises about 20 to about 200 hidden layers, about 50 to about 150 hidden layers, or about 75 to about 125 hidden layers. The first dropout condition can be based on a Bernoulli distribution, where the Bernoulli condition sets an output of the one or more nodes of the one or more hidden layers to zero. The training the neural network can include performing a regularization process to one or more inputs of the neural network to reduce a complexity of the neural network. The method can include repeatedly performing the reconstructing and the determining using one or more input data that are identical from a previous iteration of the neural network and the trained neural network with the first drop out condition or a different drop out condition and providing the one or more uncertainty metrics based on the reconstructing and the determining that are repeatedly performed. The type of the one or more uncertainty metrics can be based on a type of the geophysical structure being modeled. The type of the one or more uncertainty metrics can include an entropy for classification modeling or distribution moments for regression modeling. The method can include displaying, on a computer display, the geophysical structure is that is reconstructed with the one or more uncertainty metrics.

A method, a computing system that performs the method, and a computer-readable medium that stores instructions for performing the method are disclosed preventing overfitting by a neural network using a dropout layer to block a portion of the input data when training the neutral network; receiving a seismic image; identifying a structure in the seismic image using the neural network a plurality of times, wherein each of the times, a selection of the neural nodes are blocked using a dropout layer; and quantifying the uncertainty based on an entropy of aggregated results from the identifying and/or based on a confidence interval of the identifying.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 1A, 1B, 1C, 1D, 2, 3A, and 3B illustrate simplified, schematic views of an oilfield and its operation, according to an embodiment.

DESCRIPTION OF EMBODIMENTS

Figure 2:
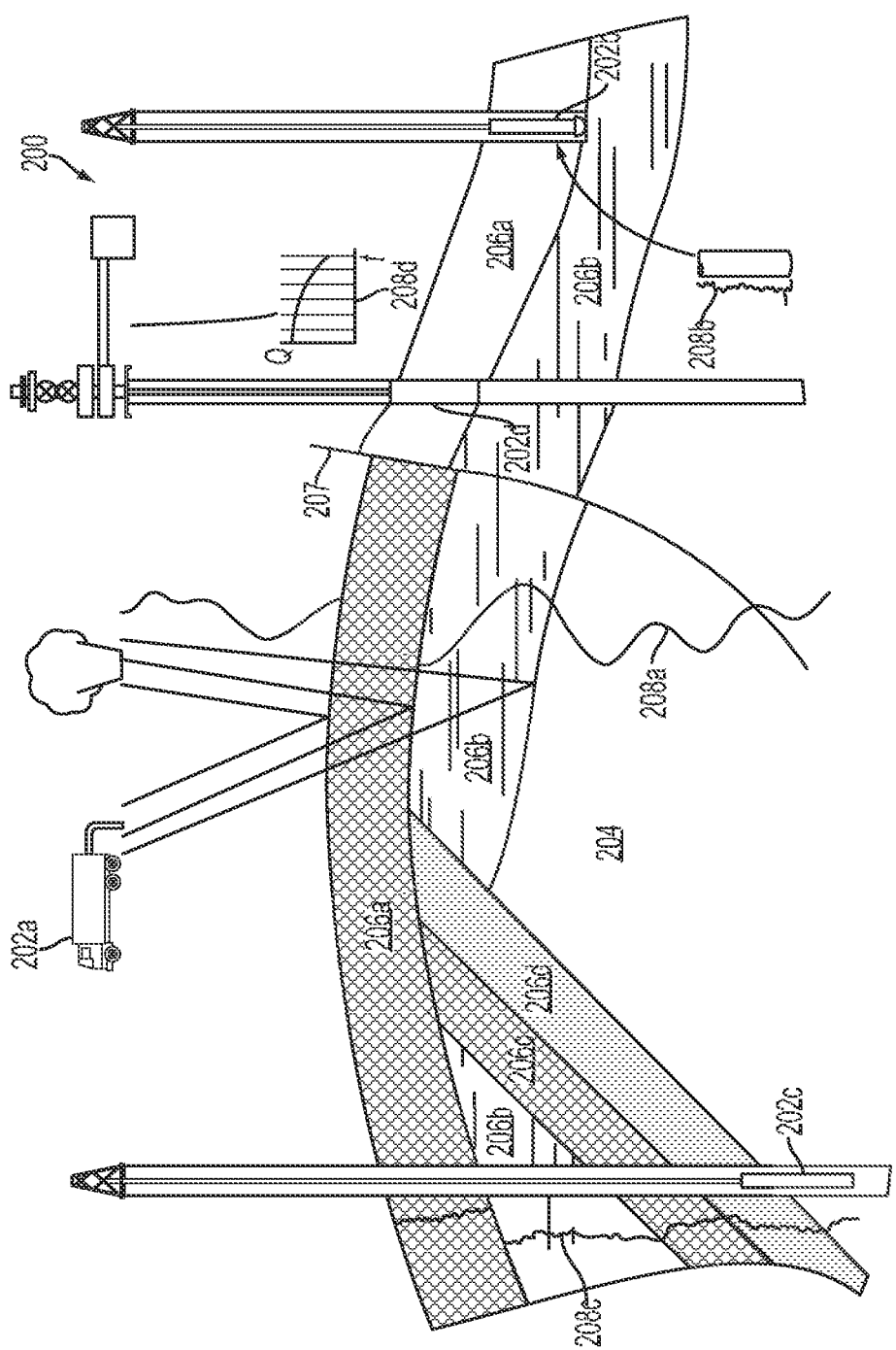

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106.1, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 1B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

FIG. 1C illustrates a wireline operation being performed by wireline tool 106.3 suspended by rig 128 and into wellbore 136 of FIG. 1B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 1A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 1D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 1A-1D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively; however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that typically provides a resistivity or other measurement of the formation at various depths.

A production decline curve or graph 208.4 is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208.1 from data acquisition tool 202.1 is used by a geophysicist to determine characteristics of the subterranean formations and features. The core data shown in static plot 208.2 and/or log data from well log 208.3 are typically used by a geologist to determine various characteristics of the subterranean formation. The production data from graph 208.4 is typically used by the reservoir engineer to determine fluid flow reservoir characteristics. The data analyzed by the geologist, geophysicist and the reservoir engineer may be analyzed using modeling techniques.

Figure 3A:
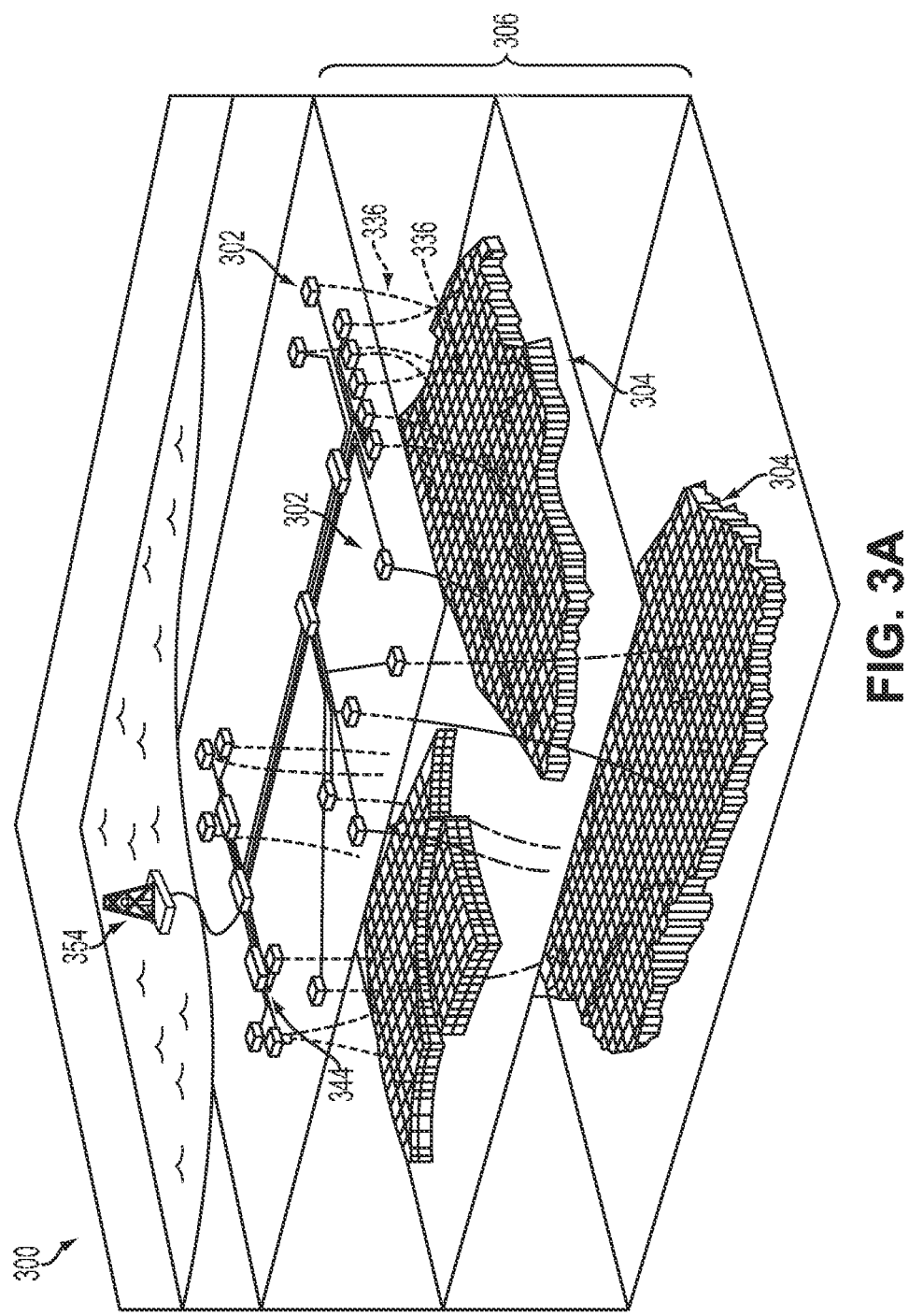

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 3B:
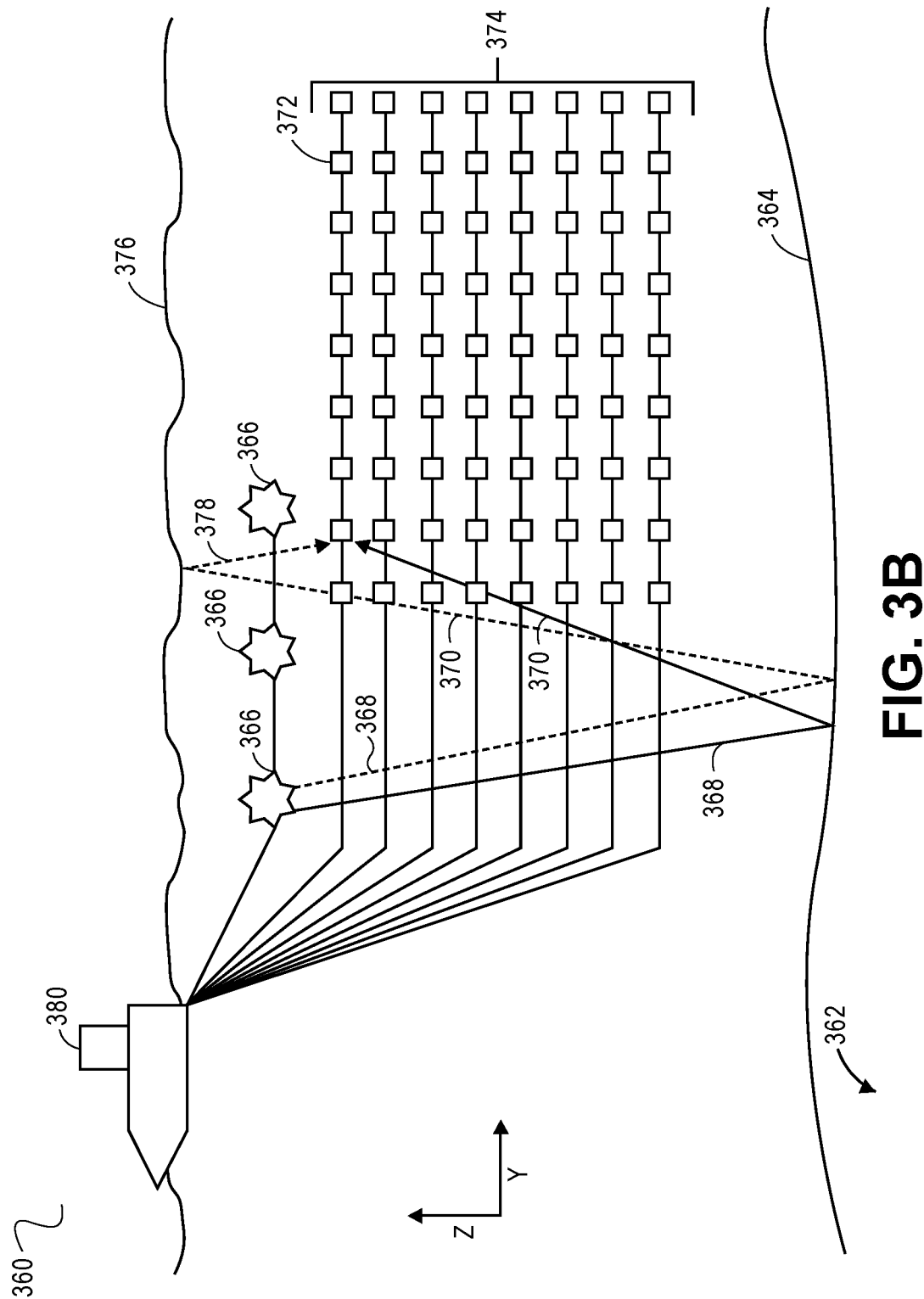

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

General Workflow

In general, embodiments of the present disclosure may provide a method that is applicable for deep learning models, such as recurrent neural networks (RNN) and convolutional neural networks (CNN), and serves various purposes (log-QC, seismic image segmentation, etc.). Implementations of this workflow may provide an uncertainty analysis for deep learning based product. Further, this workflow may be applied to different ML models with little or no change in the structure of the models.

Embodiments of the present disclosure may use the dropout layer in neural networks to generate Monte Carlo samples. The dropout layer, which randomly blocks a portion of neural nodes, may also be used as a method for regularization to prevent overfitting in deep learning. The dropout layer may be deactivated during inference stage to generate a prediction. To generate Monte Carlo samples, however, the dropout layer is maintained active during inference stage. This may be similar to a Bernoulli distribution to approximate the poster distribution of model parameters. With dropout layer activated and an analysis for N times, N Monte Carlo samples may be generated.

Figure 4:
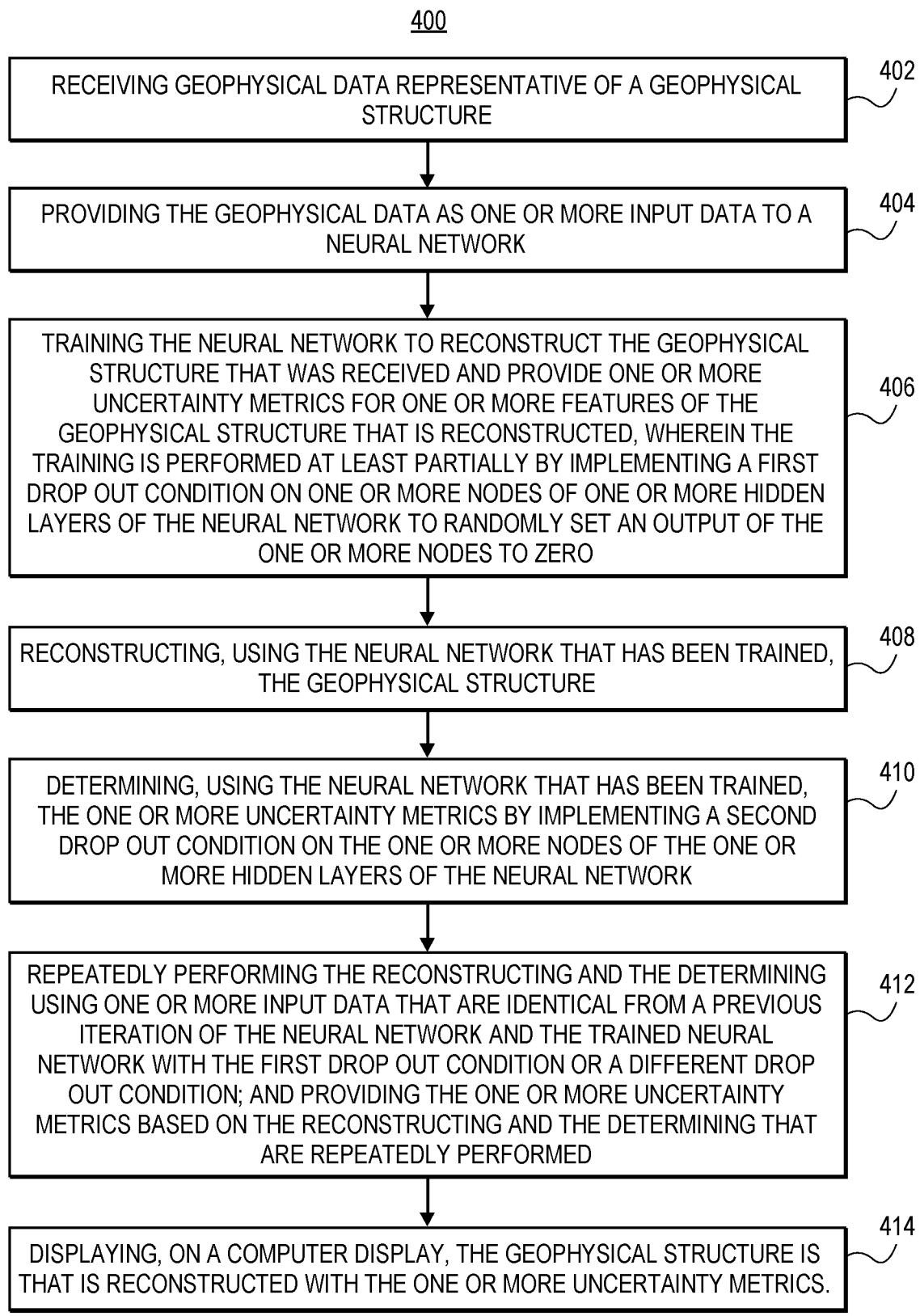
FIG. 4 illustrates a method for estimating uncertainties in modeled geophysical structures according to the present teachings.

The method 400, illustrated in FIG. 4, may begin by acquiring or receiving geophysical data representative of a geophysical structure to be modeled and uncertainties estimated at 402. For example, the geophysical data can comprise poststack seismic amplitude data, prestack seismic amplitude data, seismic amplitude data, seismic amplitude derived properties, well log data, well log derived properties, structure interpretation data, stratigraphy interpretation data, or lithology interpretation data. In some examples, the well log data can comprise gamma ray (GR) logs, neutron porosity (NPHI) logs, or bulk density (RHOZ) logs. In some examples, the well logs may be a priori unlabeled, or may be partially labeled, or entirely labeled. In this context, "labeled" means that a human user has reviewed the well log and indicated incomplete or erroneous sections of the data, which may provide the basis for supervised learning, as a machine learning model may make predictions based on the human user's conclusions.

The method 400 continues by providing the geophysical data as one or more input data to a neural network at 404. In some examples, the neural network can include a deep learning neural network, such as a convolutional neural network (CNN), a pointwise autoencoder with about 3 to about 20 dense layers, a long short-term memory (LSTM) network, a bidirectional LSTM sequential autoencoder, or a 2D/1D-CNN autoencoder with about 5 to about 20 convolutional blocks. In some examples, the one or more hidden layers can comprise about 20 to about 200 hidden layers, about 50 to about 150 hidden layers, or about 75 to about 125 hidden layers. The number of hidden layers is dependent, at least in part, on the problem complexity and a particular data signature. In some examples, a particular network can have tens to more than a thousand hidden layers.

Figure 5:
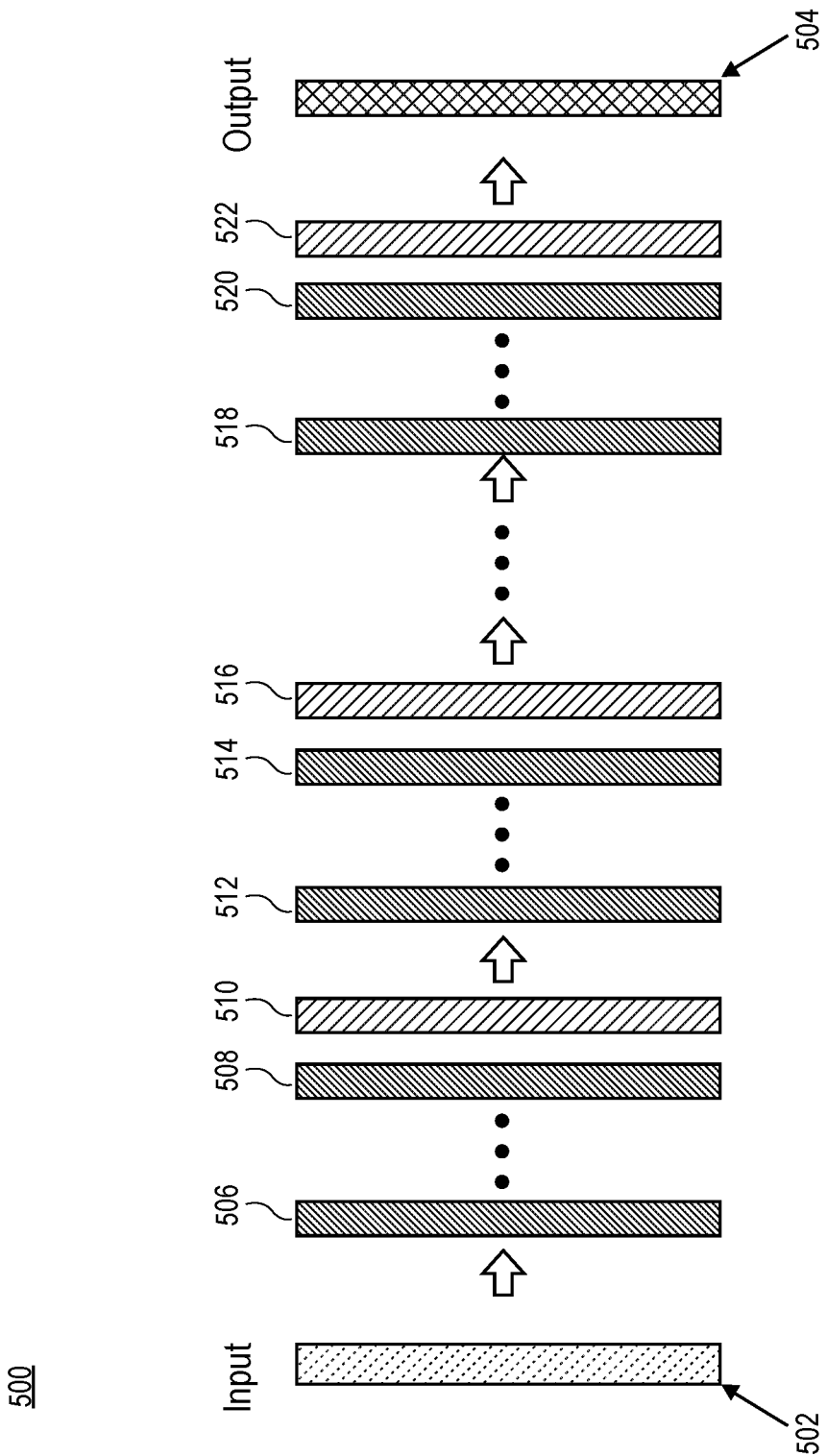
FIG. 5 shows an example of a neural network according to the present teachings.

FIG. 5 shows an example of a neural network 500 having an input layer 502, an output layer 504, and a plurality of hidden layers 506, 508, 510, 512, 514, 516, 518, 520, and 522 arranged between the input layer 502 and the output layer 504. In the example shown, hidden layers 510, 516, and 522 are chosen as the dropout layers. Other hidden layers may be chosen as the dropout layer depending on the modeling being performed. In some examples, each hidden layer comprises a plurality of nodes (not shown). In the dropout layers chosen, one or more nodes of the dropout layer can be randomly chosen to be dropped out and their outputs not sampled.

Figure 6:
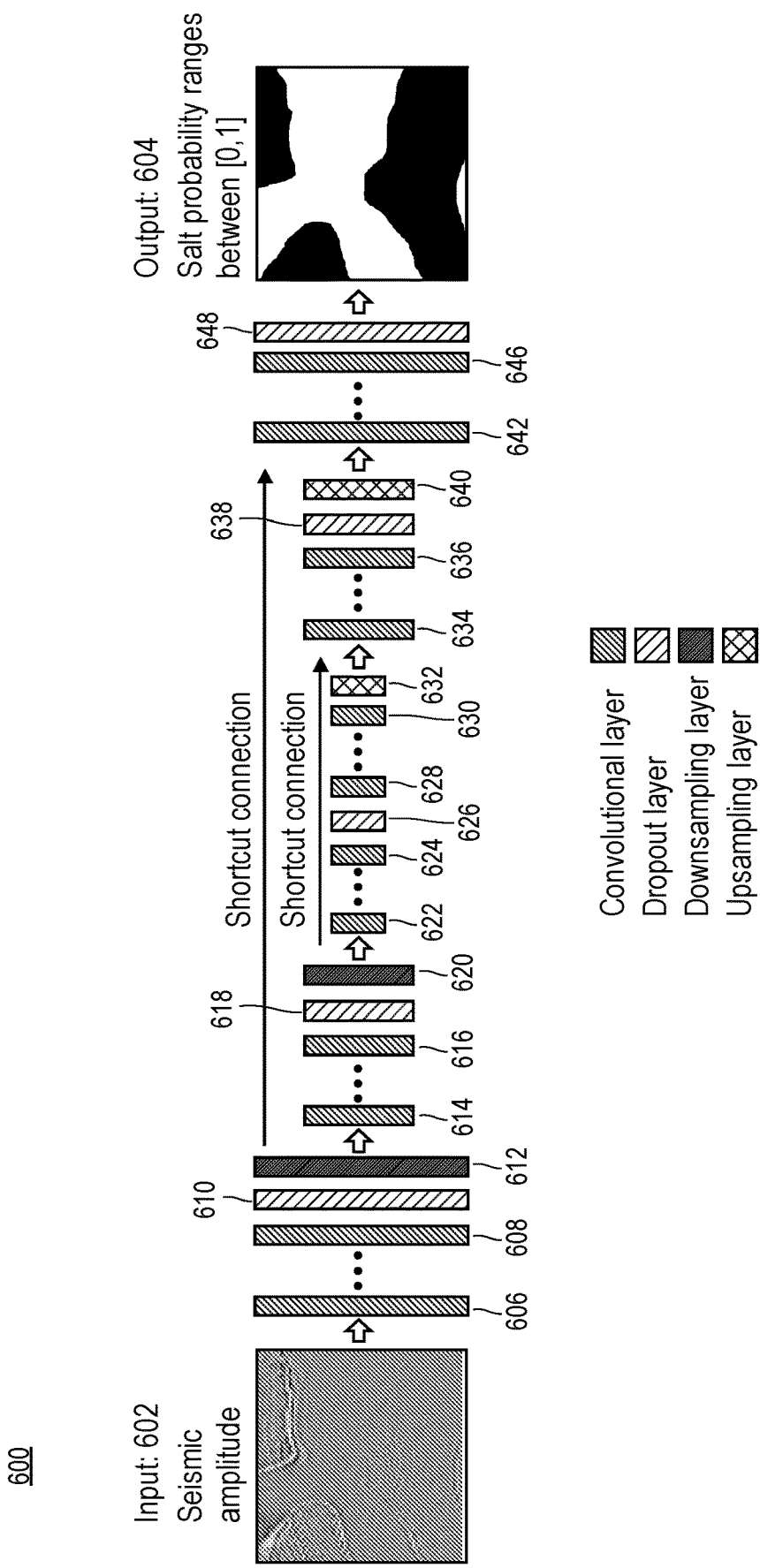
FIG. 6 shows an example of a neural network according to the present teachings.

FIG. 6 shows an example of a neural network 600 that can be used for classification modeling, such as a salt detection classification modeling example. The neural network 600 has an input layer 602, an output layer 604, and a plurality of hidden layers 606, 608, 610, 612, 614, 616, 618, 620, 622, 624, 626, 628, 630, 632, 634, 636, 638, 640, 644, 646, and 648 arranged between the input layer 602 and the output layer 604. In the example shown, hidden layers 606, 608, 614, 616, 622, 624, 628, 630, 634, 636, 642, and 646 are chosen as convolutional layers, hidden layers 610, 618, 626, 638, and 648 are chosen as the dropout layers, hidden layers 612 and 620 are chosen as downsampling layer, and hidden layers 632 and 640 are chosen as upsampling layer. Other hidden layers may be chosen as the dropout layer depending on the modeling being performed. In some examples, each hidden layer includes a plurality of nodes (not shown). In the dropout layers chosen, one or more nodes of the dropout layer can be randomly chosen to be dropped out and their outputs not sampled. In an example, the neural network 600 can be modified by removing or not sampling from hidden layers 614, 616, 618, 620, 622, 624, 626, 628, 630, 632, 634, 636, 638, and 640. In another example, the neural network 600 can be modified by removing or not sampling from hidden layers 622, 624, 626, 628, 630, and 632.

Figure 7:
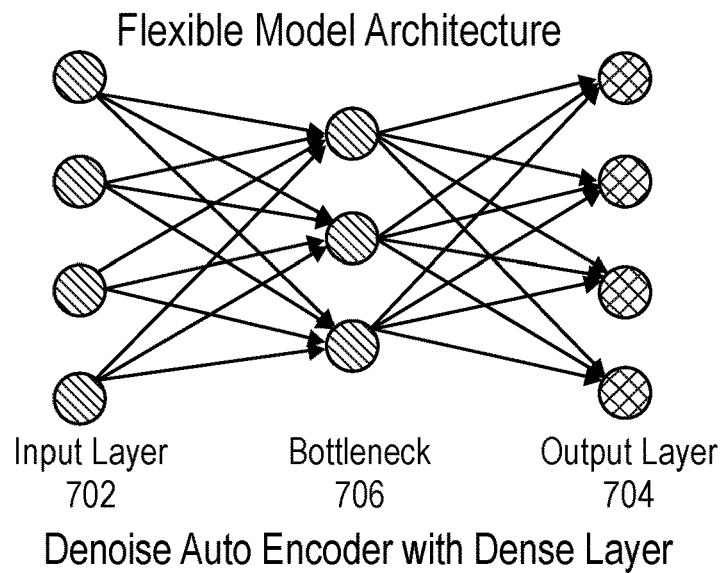
FIG. 7 shows an example of a neural network according to the present teachings.
Figure 8:
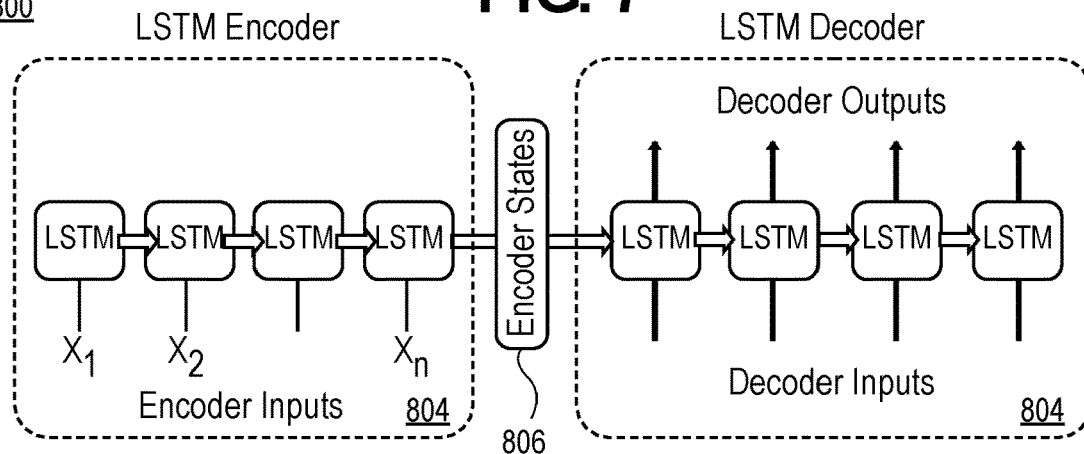
FIG. 8 shows an example of a neural network according to the present teachings.
Figure 9:
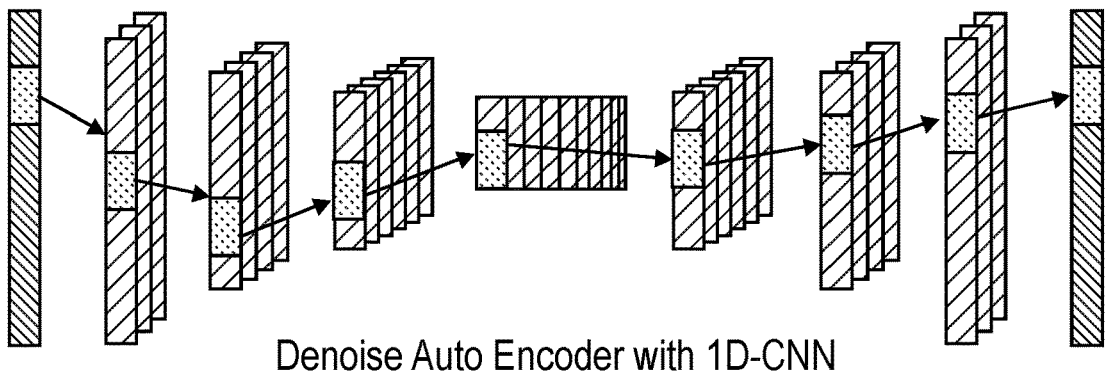
FIG. 9 shows an example of a neural network according to the present teachings.

FIG. 7, FIG. 8, and FIG. 9 show other examples of a neural network 600 according to the present disclosure. In FIG. 7, a denoise autoencoder with a dense layer 700 is shown with an input layer 702 having a plurality of input layer nodes, an output layer 704 including a plurality of output layer nodes, and a bottleneck layer (hidden layer) 706 including a plurality of bottleneck layer nodes arranged between the input layer 702 and the output layer 704. In FIG. 8, a denoise sequential/auto encoder with a long short-term memory (LSTM) network 800 is shown with a LSTM encoder 802 as the input layer, a LSTM decoder 804 as the output layer, and encoder states 806 as the hidden layer between the LSTM encoder 802 and the LSTM decoder 804. In FIG. 9, a denoise auto encoder with a 1D-CNN 900 is shown.

Returning to FIG. 4, the method 400 continues by training the neural network to reconstruct the geophysical structure and provide one or more uncertainty metrics on one or more features of the geophysical structure being reconstructed at 406. The training is performed by implementing the training is performed at least partially by implementing a first drop out condition on one or more nodes of one or more hidden layers of the neural network to randomly set an output of the one or more nodes to zero. Following a Bernoulli distribution with probability p (dropout rate), the dropout layer randomly sets a subset of the multidimensional output from the previous layer to zero. Within each dropout layer, such dropout can perform on contiguous multidimensional samples, or uniformly over all samples. For example, during training, the dropout rate is in the range of (0, 1) and L2 regularization may be applied to one or more, including all, trainable variables within a neural network.

The method 400 continues by reconstructing, using the neural network that has been trained, the geophysical structure at 408. Next, the method 400 includes determining, using the neural network that has been trained, the one or more uncertainty metrics by implementing a second drop out condition on the one or more nodes of the one or more hidden layers of the neural network at 410. In some examples, the second drop out condition can be the same or different than the first drop out condition. In some examples, the method 400 continues by repeatedly performing the reconstructing and the determining using one or more input data that are identical from a previous iteration of the neural network and the trained neural network with the first drop out condition or a different drop out condition and providing the one or more uncertainty metrics based on the reconstructing and the determining that are repeatedly performed at 412. The type of the one or more uncertainty metrics can be based on a type of the geophysical structure being modeled. The type of the one or more uncertainty metrics can comprise an entropy for classification modeling or distribution moments for regression modeling. In some examples, the method 400 continues by displaying, on a computer display, the geophysical structure is that is reconstructed with the one or more uncertainty metrics at 414. The geophysical structures and the one or more uncertainty metrics can be displayed using a variety of graphical and/or textual elements to provide an operator with visual depiction of the modeling results.

For example for classification problems, the uncertainty may be quantified using the entropy of aggregated results from the N Monte Carlo samples:

$$p(y_i = c_i/X) \approx \frac{1}{N}\sum_{t=1}^{N} p(y_{i,t} = c_i/X, W^t) \quad (1)$$

$$H[y_i/X] = -\sum_c P(y_i = c_i/X)\log p(y_i = c_i/X) \quad (2)$$

where $p(y_i=c_i/X)$ is the probability of target $y_j$ being classified as $c_i$ given X is the input data. $y_{i,t}$ and $W^t$ are the class and model weights from Monte Carlo sample t. $H[y_i/X]$, the measure of uncertainty is the entropy of the aggregated results from the Monte Carlo samples.

For example, for regression problems, the confidence interval from the N Monte Carlo samples is used to quantify the uncertainty.

$$\text{confidence interval}=[\mu-2\sigma,\mu+2\sigma] \quad (3)$$

where $$\mu = \frac{1}{N}\sum y_t$$

and σ are the mean and std of the Monte Carlo samples.

This method 400 may be used in log-QC to quantify the uncertainty in outlier detection, log reconstruction, and also been used in seismic image segmentation analysis. The workflow may be applied to various different neural network model (RNN, CNN, etc.) based products. In some embodiments, the model structure may be modified for following Bayesian Neural Networks, and retrain, re-test the model before uncertainty analysis.

Machine Learning Model

CNNs have achieved promising performance in semantic segmentation tasks. U-net has been applied in biomedical image segmentation analysis and then adopted in geophysics application. In this study, for demonstration purpose, a modified U-net is used as the machine learning model for salt body detection problems.

Monte Carlo Dropout

Dropout is a method to prevent overfitting in neural networks. In practice, dropout is implemented as a layer in a neural network, which randomly sets a portion of the input data of that layer to zero when training a neural network. Once the network is trained, dropout is then disabled during the prediction stage. Dropout for hidden layers may be between 0.2 to 0.5. In an embodiment, the dropout value may be heuristically set to 0.3, meaning 30% of the data passing through a dropout layer is set to 0. To increase the effect of dropout, a dropout layer may be added after individual every convolutional layers in the CNN model.

The epistemic uncertainty of a deep learning model may be analyzed under the framework of Bayesian deep learning. Bayesian deep learning estimates the epistemic uncertainties by computing the posterior distribution of model parameters p(W/X, Y), where W is the weights of the neural networks, X is the inputs, and Y is the labels. However, this posterior distribution is intractable and the variational inference is needed to approximate this posterior distribution, where an approximation q(W) is obtained by minimizing the Kullback-Leibler (KL) divergence, which is KL(q(W)∥p(W/X, Y)) The prediction stage may be used to approximate the posterior distribution over the weights of the network. In the prediction stage, applying dropout is viewed as equivalent to use Bernoulli distribution to approximate the posterior distribution of the model parameters. Therefore, to implement a CNN model with MC dropout, changes may not be made to the model structure except enabling dropout during prediction. In the prediction stage, the dropout rate is kept the same as in the training stage, and run N times to retrieve multiple Monte Carlo samples. Then the approximative class probability from N Monto Carlo samples is as shown in Equation (1) (reproduced below as equation (4))

$$p(y_i = c_i/X) \approx \frac{1}{N}\sum_{k=1}^{N} p(y_{i,t} = c_i/X, W^t)$$ (4)

where X is the data within the effective receptive field in an input image, $y_j$ is the class for pixel at i, $y_{i,t}$ and $W^t$ are the class for pixel and model weights from Monte Carlo sample t, and c is the true class label at pixel i. The uncertainty of the classification is then derived using entropy, as described in Equation (2), reproduced below as equation (5):

$$H[y_i/X]=-\Sigma_c P(y_i=c_f/X)\log p(y_i=c_f/X)$$ (5)

EXAMPLE

Figure 10:
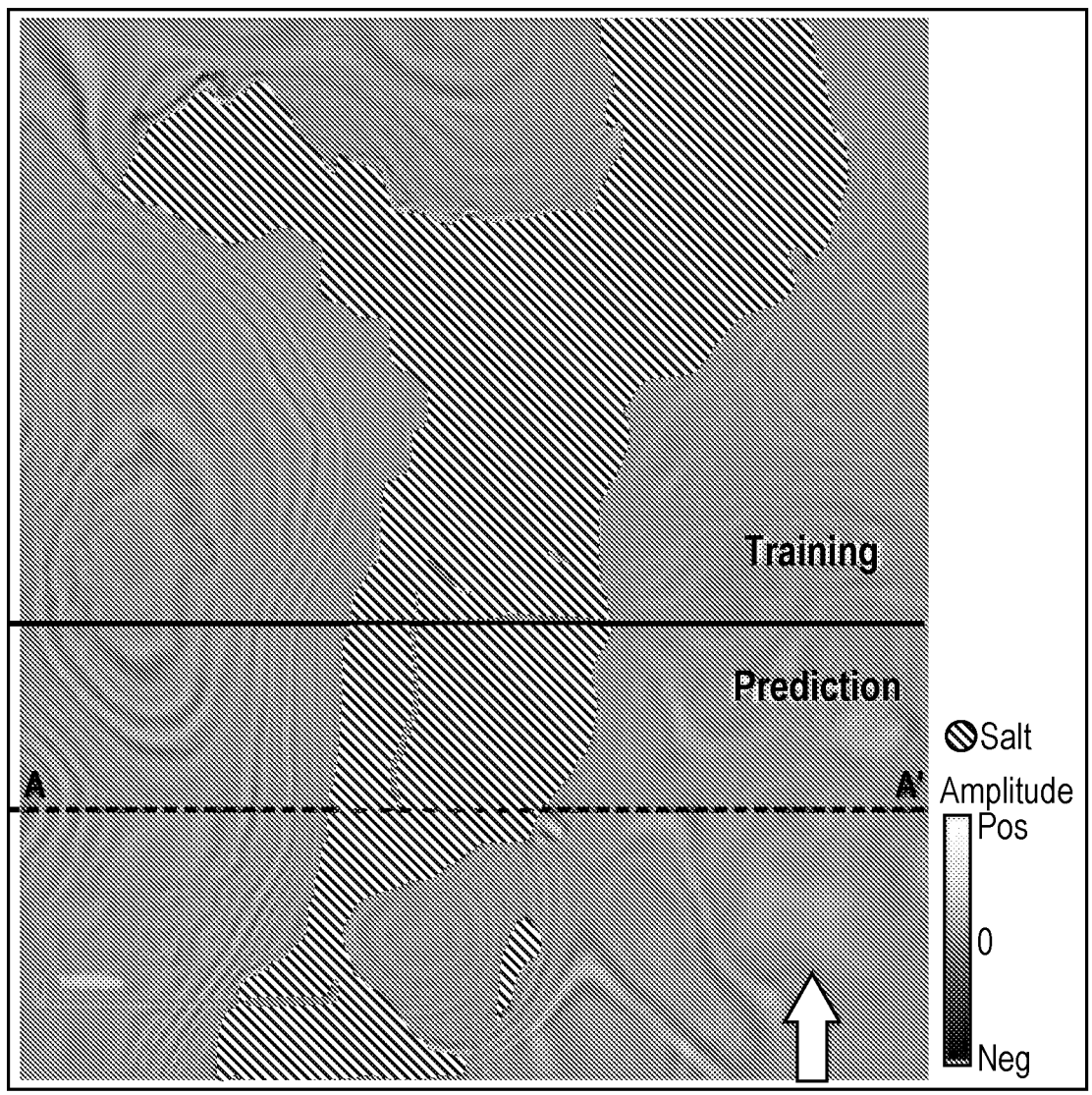
FIG. 10 illustrates a depth slice from SEAM Phase 1 data showing the training and prediction data partition. The data above ("North" of) the line is used in training, and the date below ("South" of) the line is used in prediction. Line A-A denotes the vertical profile shown in the subsequent figures.
Figure 11:
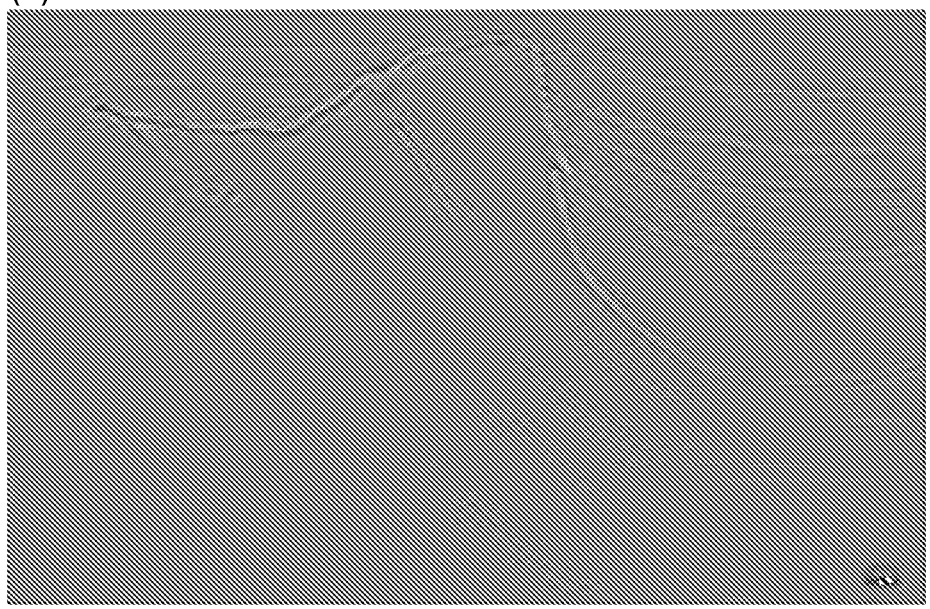
FIG. 11 illustrates a vertical profile along line A-A, with the top showing seismic data and the bottom showing seismic data with a true salt mask.
Figure 11:
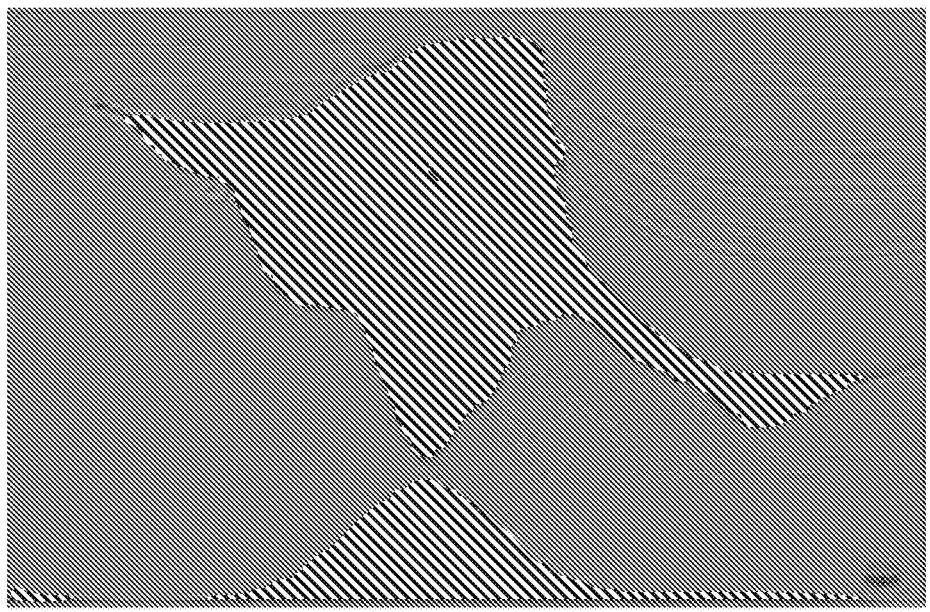
Figure 12:
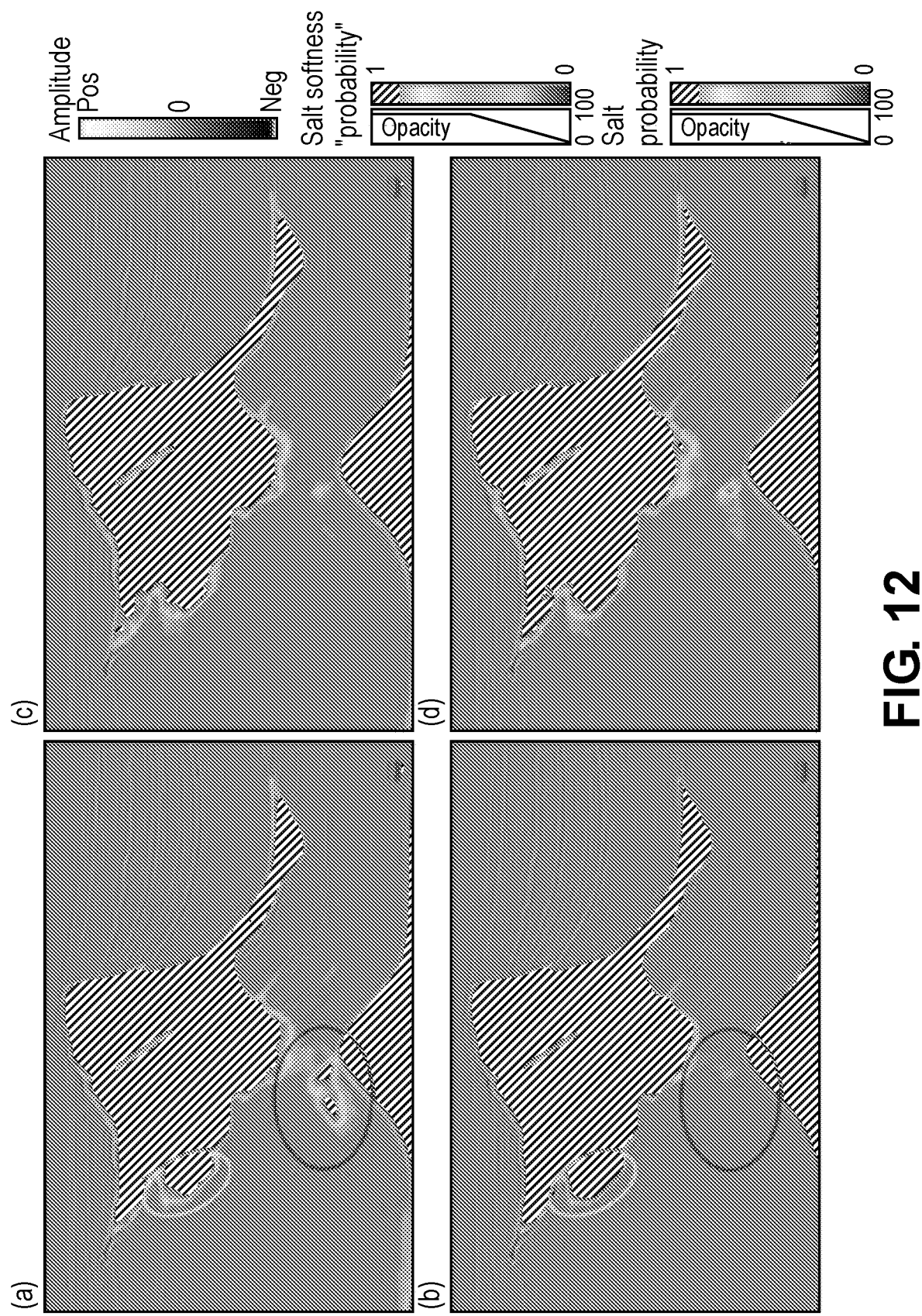
FIG. 12 illustrates ML prediction results along line A-A. In particular, the upper left illustrates softmax "probability" from one-shot prediction with dropout disabled; the lower left illustrates aggregated classification result over 100 prediction runs with dropout enabled, using the classification cut-off at 0.5; and the right column illustrates Softmax "probability" from two runs with dropout enabled.

SEAM Phase 1 seismic data is employed in this example. In this example, the seismic volume is separated into two segments, one for training and the other for prediction, as shown in FIG. 10 and separated by the line A-A. The CNN model may be trained until convergence using the training segment with a dropout rate of 0.3. The seismic data and the associated true salt mask along a vertical section of interest from the prediction section are provided in FIG. 11. After training, predictions are run in two scenarios. First, the CNN model is applied to the prediction section with dropout disabled, which is consistent with prior efforts to train a CNN model in a one-shot fashion. The output the salt softmax is referred to as "probability", which is shown in FIG. 6, upper left. The prediction is then run 100 times with dropout enabled. FIG. 12, upper right and lower right show two examples from the 100 runs. Because of the random dropout, the output varies from run to run in the second test scenario. The aggregated classification result of the 100 runs is then used to produce the true salt probability, as in FIG. 6, lower left. The cut-off value for each classification is set to 0.5, which means samples with softmax output greater than 0.5 is considered as salt, and vice versa. The value at a sample in this salt probability cube is interpreted as how many times that sample is classified as salt out of the 100 runs, scaled to [0,1]. In both scenarios, the CNN model remains the same, although dropout during prediction is enabled in the second scenario.

From FIG. 12, upper left and lower left, it can be seen that the two results are in good agreement in general, but the big blub which is misclassified to salt (marked with black oval) in the upper left is largely corrected in the lower left. This observation implies that although the one-shot prediction from the ML model produces fairly high softmax value for the suspicious salt blub, such prediction is not consistent with the expectation of a slightly perturbed ML model. In other words, a high softmax "probability" does not translate to high prediction confidence nor low uncertainty; therefore, it may be risky to rely on the ML one-shot prediction result. In contrast, by taking the mean of 100 runs with random perturbation, FIG. 12, lower left, approximates the true prediction probability of the ML model, given the data and model parameters.

Figure 13:
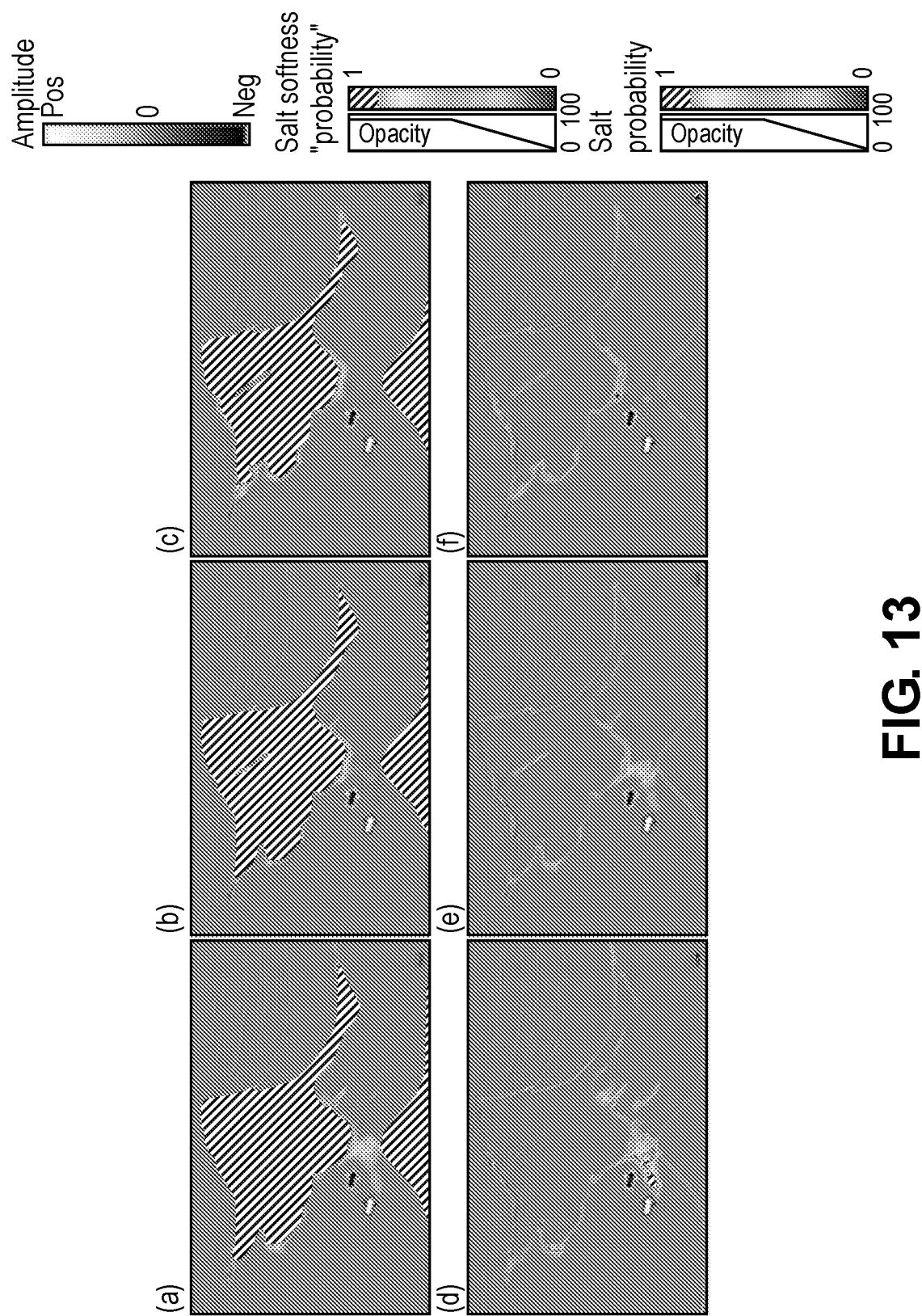
FIG. 13 illustrates aggregated classification result over 100 prediction runs with dropout enabled, with associated uncertainty, using different classification cut-off values. In particular, the upper left illustrates aggregated classification result with cut-off at 0.1; upper middle illustrates aggregated classification result with cut-off at 0.5; upper right illustrates aggregated classification result with cut-off at 0.9; lower left illustrates uncertainty of the result in the upper left; lower middle illustrates uncertainty of the result in the upper middle; and lower right illustrates uncertainty of the result in the upper right.

The entropy of the aggregated classification result may be used to quantify the epistemic uncertainty of the ML model. The aggregated classification results with associated uncertainty maps in FIG. 13, at classification cut-off values of 0.1, 0.5, and 0.9. A classification cut-off value of 0.1 corresponds to scenario where samples with softmax output greater than 0.1 are considered as salt, whereas a classification cut-off value of 0.9 refers to scenario where samples with softmax output greater than 0.9 are considered as salt. Intuitively, more samples are classified as salt using a lower cut-off value. From the uncertainty map, it can be seen that areas marked by the black and white arrows contain very high uncertainty, especially when the classification cut-off value is 0.1. By comparing FIG. 14, left and right, against the true salt mask, it is seen that the ML model is uncertain about the areas marked by black and white arrows. In this case, the ML model is able to correctly predict at the black arrow but failed at the white arrow.

Figure 14:
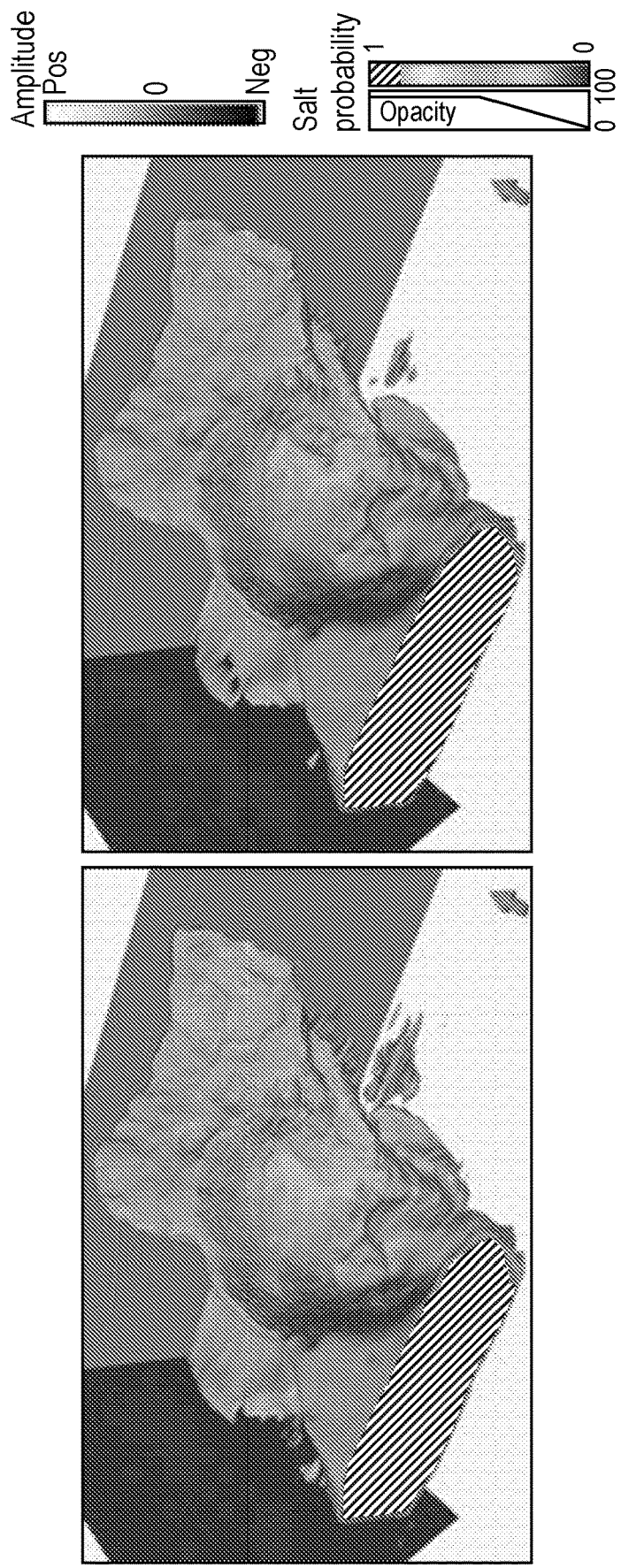
FIG. 14 illustrates a salt body extracted with, on the left, a classification cut-off of 0.1, and on the right, a classification cut-off of 0.5.

The uncertainty map complementary to the results map when interpreting the predicted result, because it highlights the regions in which the ML prediction result may be unreliable. When using MC dropout to approximate the true prediction probability and quantify uncertainty, different versions (realizations) of results can be generated using different classification cut-off and uncertainty levels (FIG. 14). It is emphasized that the MC dropout method measures epistemic uncertainty, which reflects the confidence of results due to uncertainty from model structure or parameters. It does not measure the "goodness" of fit of the model. For example, in FIG. 13, the misclassified area marked by white oval shows very low uncertainty in FIG. 14. Such uncertainty has to be quantified, and the misclassification may hopefully be mitigated, by improved ML model parameters and/or better training data.

In this study, epistemic uncertainty is estimated using Monte Carlo (MC) dropout for machine learning (ML)-based seismic image segmentation. Using a convolution neural network-based salt body detection example, using the same trained ML model, the mean of multiple dropout-perturbed ML prediction runs provides a more appropriate prediction probability than the softmax output of a one-shot ML prediction run. The uncertainty map derived from such MC dropout prediction facilitates interpretation of the ML output by highlighting the regions in which the ML prediction result may be unreliable. Although the MC dropout prediction includes running the ML prediction multiple times, it does not increase the computational time because individual predictions can be generated concurrently.

Computing Environment

In one or more embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 15:
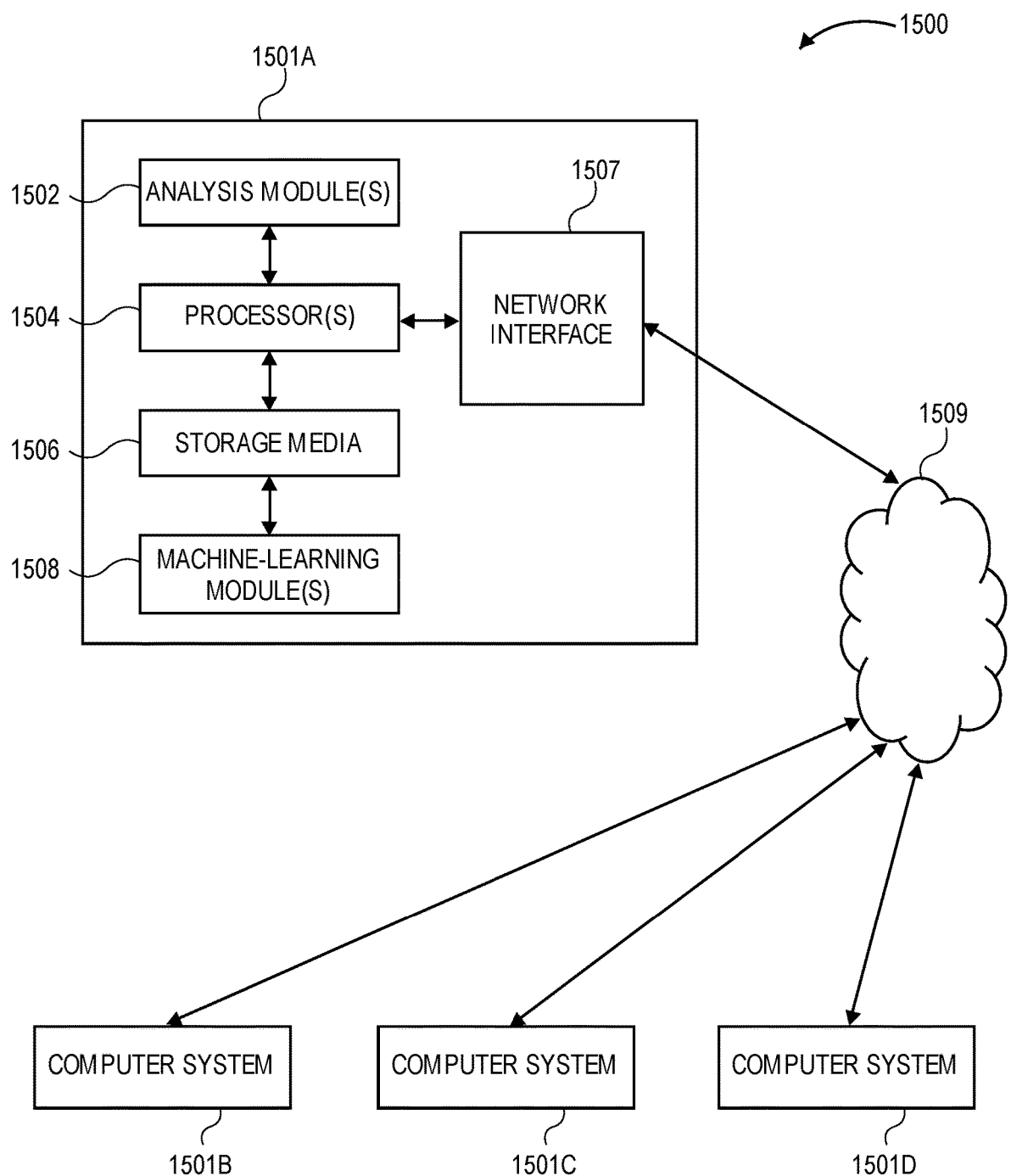
FIG. 15 illustrates a schematic view of a computing system, according to an embodiment.

In some embodiments, any of the methods of the present disclosure may be executed by a computing system. FIG. 15 illustrates an example of such a computing system 1500, in accordance with some embodiments. The computing system 1500 may include a computer or computer system 1501A, which may be an individual computer system 1501A or an arrangement of distributed computer systems. The computer system 1501A includes one or more analysis module(s) 1502 configured to perform various tasks according to some embodiments, such as one or more methods disclosed herein. To perform these various tasks, the analysis module 1502 executes independently, or in coordination with, one or more processors 1504, which is (or are) connected to one or more storage media 1506. The processor(s) 1504 is (or are) also connected to a network interface 1507 to allow the computer system 901A to communicate over a data network 1509 with one or more additional computer systems and/or computing systems, such as 1501B, 1501C, and/or 1501D (note that computer systems 1501B, 1501C and/or 1501D may or may not share the same architecture as computer system 1501A, and may be located in different physical locations, e.g., computer systems 1501A and 1501B may be located in a processing facility, while in communication with one or more computer systems such as 1501C and/or 1501D that are located in one or more data centers, and/or located in varying countries on different continents).

A processor can include a microprocessor, microcontroller, processor module or subsystem, programmable integrated circuit, programmable gate array, or another control or computing device.

The storage media 1506 can be implemented as one or more computer-readable or machine-readable storage media. Note that while in the example embodiment of FIG. 15 storage media 1506 is depicted as within computer system 1501A, in some embodiments, storage media 1506 may be distributed within and/or across multiple internal and/or external enclosures of computing system 1501A and/or additional computing systems. Storage media 1506 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 1500 contains one or more machine-learning module(s) 1508. In the example of computing system 1500, computer system 1501A includes the machine-learning module 1508. In some embodiments, a single machine-learning module may be used to perform some or all aspects of one or more embodiments of the methods. In alternate embodiments, a plurality of machine-learning modules may be used to perform some or all aspects of methods.

It should be appreciated that computing system 1500 is only one example of a computing system, and that computing system 1500 may have more or fewer components than shown, may combine additional components not depicted in the example embodiment of FIG. 15, and/or computing system 1500 may have a different configuration or arrangement of the components depicted in FIG. 15. The various components shown in FIG. 15 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Embodiments of the present methods discussed herein can include use of feedback loops executed on an algorithmic basis, such as at a computing device (e.g., computing system 1500, FIG. 15), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A method comprising:
   receiving interpretation data to analyze for uncertainty, wherein the interpretation data corresponds to a machine learning output representative of a geophysical structure;
   conducting a training phase to train a deep learning neural network using the interpretation data, wherein the training phase comprises:
   modifying the interpretation data via a first drop out condition applied to one or more nodes of one or more hidden layers of the deep learning neural network to randomly set an output of the one or more nodes to zero;
   providing the modified interpretation data as input data to train the deep learning neural network; and
   training the deep learning neural network using the modified interpretation data to generate a trained deep learning neural network;

subsequent to the training phase, conducting a prediction phase to reproduce the geophysical structure utilizing the trained deep learning neural network, wherein the prediction phase comprises:
    enabling a second drop out condition on the one or more nodes of the one or more hidden layers of the trained deep learning neural network;
    generating an output, using the trained deep learning neural network, wherein the generated output comprises a reconstructed geophysical structure; and
    determining, using the trained deep learning neural network, one or more uncertainty metrics associated with one or more features of the reconstructed geophysical structure, wherein the one or more uncertainty metrics correspond to an accuracy of the reconstructed geophysical structure and are indicative of a reliability of the interpretation data, and wherein the one or more uncertainty metrics comprise an entropy for classification modeling and one or more distribution moments for regression modeling;
    outputting the reconstructed geophysical structure and the one or more uncertainty metrics for display on a computer display; and
    displaying, on the computer display, the reconstructed geophysical structure and the one or more uncertainty metrics, wherein the one or more uncertainty metrics are displayed using graphical visual icons.

2. The method of claim 1, wherein the interpretation data comprises at least one of poststack seismic amplitude data, prestack seismic amplitude data, seismic amplitude data, seismic amplitude derived properties, well log data, well log derived properties, structure interpretation data, stratigraphy interpretation data, or lithology interpretation data.

3. The method of claim 2, wherein the well log data comprises at least one of gamma ray (GR) logs, neutron porosity (NPHI) logs, or bulk density (RHOZ) logs.

4. The method of claim 1, wherein the deep learning neural network, the trained deep learning neural network, or both comprises a convolutional neural network (CNN), a pointwise autoencoder with about 3 to about 20 dense layers, a long short-term memory (LSTM) network, a bidirectional LSTM sequential autoencoder, or a 2D/1D-CNN autoencoder with about 5 to about 20 convolutional blocks.

5. The method of claim 1, wherein the one or more hidden layers of the deep learning neural network and the trained deep learning neural network comprises about 20 to about 200 hidden layers, about 50 to about 150 hidden layers, or about 75 to about 125 hidden layers.

6. The method of claim 1, wherein the first dropout condition is based on a Bernoulli distribution, where the Bernoulli condition sets an output of the one or more nodes of the one or more hidden layers to zero.

7. The method of claim 1, wherein modifying the interpretation data comprises performing a regularization process to reduce a complexity of the input data provided to the deep learning neural network.

8. The method of claim 1, further comprising:
    repeatedly conducting the prediction phase to reproduce the geophysical structure by enabling one or more additional drop out conditions using the input data to generate one or more additional reconstructed geophysical structures, wherein the input data is identical from a previous iteration of the deep learning neural network and the trained deep learning neural network with the first drop out condition or a different drop out condition; and
    determining one or more additional uncertainty metrics based on the one or more additional reconstructed geophysical structures that are repeatedly generated.

9. The method of claim 8, further comprising quantifying the one or more uncertainty metrics and the one or more additional uncertainty metrics based on an entropy of aggregated results of the reconstructed geophysical structure and the one or more additional reconstructed geophysical structures.

10. The method of claim 9, wherein the aggregated results are determined based on a confidence interval.

11. The method of claim 1, wherein a type of the one or more uncertainty metrics is based on a type of the geophysical structure being modeled.

12. A computing system, comprising:
    one or more processors; and
    a memory system comprising one or more non-transitory, computer-readable media storing instructions that, when executed by at least one of the one or more processors, cause the computing system to perform operations, the operations comprising:
    receiving interpretation data to analyze for uncertainty, wherein the interpretation data corresponds to a machine learning output representative of a geophysical structure;
    conducting a training phase to train a deep learning neural network using the interpretation data, wherein the training phase comprises:
        modifying the interpretation data via a first drop out condition applied to one or more nodes of one or more hidden layers of the deep learning neural network to randomly set an output of the one or more nodes to zero;
        providing the modified interpretation data as input data to train the deep learning neural network; and
        training the deep learning neural network using the modified interpretation data to generate a trained deep learning neural network;
    subsequent to the training phase, conducting a prediction phase to reproduce the geophysical structure utilizing the trained deep learning neural network, wherein the prediction phase comprises:
        enabling a second drop out condition on the one or more nodes of the one or more hidden layers of the trained deep learning neural network;
        generating an output, using the trained deep learning neural network, wherein the generated output comprises a reconstructed geophysical structure; and
        determining, using the trained deep learning neural network, one or more uncertainty metrics associated with one or more features of the reconstructed geophysical structure, wherein the one or more uncertainty metrics correspond to an accuracy of the reconstructed geophysical structure and are indicative of a reliability of the interpretation data, and wherein the one or more uncertainty metrics comprise an entropy for classification modeling and one or more distribution moments for regression modeling;
        outputting the reconstructed geophysical structure and the one or more uncertainty metrics for display on a computer display; and
        displaying, on the computer display, the reconstructed geophysical structure and the one or more uncertainty metrics, wherein the one or more uncertainty metrics are displayed using graphical visual icons.

13. The computing system of claim 12, wherein the interpretation data comprises at least one of poststack seismic amplitude data, prestack seismic amplitude data, seismic amplitude data, seismic amplitude derived properties, well log data, well log derived properties, structure interpretation data, stratigraphy interpretation data, or lithology interpretation data.

14. The computing system of claim 12, wherein the deep learning neural network, the trained deep learning neural network, or both comprise a convolutional neural network (CNN), a pointwise autoencoder with about 3 to about 20 dense layers, a long short-term memory (LSTM) network, a bidirectional LSTM sequential autoencoder, or a 2D/1D-CNN autoencoder with about 5 to about 20 convolutional blocks.

15. The computing system of claim 12, wherein the one or more hidden layers of the deep learning neural network and the trained deep learning neural network comprises about 20 to about 200 hidden layers, about 50 to about 150 hidden layers, or about 75 to about 125 hidden layers.

16. The computing system of claim 12, wherein the first dropout condition is based on a Bernoulli distribution, where the Bernoulli condition sets an output of the one or more nodes of the one or more hidden layers to zero.

17. The computing system of claim 12, wherein the operations further comprise:
repeatedly conducting the prediction phase to reproduce the geophysical structure by enabling one or more additional drop out conditions using the input data to generate one or more additional reconstructed geophysical structures, wherein the input data is identical from a previous iteration of the deep learning neural network and the trained deep learning neural network with the first drop out condition or a different drop out condition; and
determining one or more additional uncertainty metrics based on the one or more additional reconstructed geophysical structures that are repeatedly generated.

18. A non-transitory, computer-readable medium storing instructions that, when executed by at least one processor of a computing system, cause the computing system to perform operations, the operations comprising:
receiving interpretation data to analyze for uncertainty, wherein the interpretation data corresponds to a machine learning output representative of a geophysical structure;
conducting a training phase to train a deep learning neural network using the interpretation data, wherein the training phase comprises:
modifying the interpretation via a first drop out condition applied to one or more nodes of one or more hidden layers of the deep learning neural network to randomly set an output of the one or more nodes to zero;
providing the modified interpretation data as input data to train the deep learning neural network; and
training the deep learning neural network using the modified interpretation data to generate a trained deep learning neural network;
subsequent to the training phase, conducting a prediction phase to reproduce the geophysical structure utilizing the trained deep learning neural network, wherein the prediction phase comprises:
enabling a second drop out condition on the one or more nodes of the one or more hidden layers of the trained deep learning neural network;
generating an output, using the trained deep learning neural network, wherein the generated output comprises a reconstructed geophysical structure;
determining, using the trained deep learning neural network, one or more uncertainty metrics associated with one or more features of the reconstructed geophysical structure, wherein the one or more uncertainty metrics correspond to an accuracy of the reconstructed geophysical structure and are indicative of a reliability of the interpretation data, and wherein the one or more uncertainty metrics comprise an entropy for classification modeling and one or more distribution moments for regression modeling;
outputting the reconstructed geophysical structure and the one or more uncertainty metrics for display on a computer display; and
displaying, on the computer display, the reconstructed geophysical structure and the one or more uncertainty metrics, wherein the one or more uncertainty metrics are displayed using graphical visual representations.

* * * * *